(12) United States Patent
Gong et al.

(10) Patent No.: US 11,005,670 B2
(45) Date of Patent: May 11, 2021

(54) LOW STANDBY POWER CIRCUIT ARCHITECTURE FOR POWER SAVING WITHIN POWER SOURCE EQUIPMENT

(71) Applicant: PHIHONG TECHNOLOGY CO., LTD., Taoyuan (TW)

(72) Inventors: Zhenya Gong, Bohemia, NY (US); Richard Frosch, Bohemia, NY (US)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 203 days.

(21) Appl. No.: 16/010,399

(22) Filed: Jun. 15, 2018

(65) Prior Publication Data
US 2019/0386836 A1 Dec. 19, 2019

(51) Int. Cl.
| | |
|---|---|
| G06F 1/32 | (2019.01) |
| H04L 12/10 | (2006.01) |
| G06F 1/26 | (2006.01) |
| G08B 5/36 | (2006.01) |
| H04L 12/12 | (2006.01) |

(52) U.S. Cl.
CPC .............. *H04L 12/10* (2013.01); *G06F 1/266* (2013.01); *G08B 5/36* (2013.01); *H04L 12/12* (2013.01)

(58) Field of Classification Search
None
See application file for complete search history.

(56) References Cited

U.S. PATENT DOCUMENTS

| | | | | |
|---|---|---|---|---|
| 2007/0170909 | A1* | 7/2007 | Vorenkamp | G06F 1/266 324/76.11 |
| 2009/0228722 | A1* | 9/2009 | Lin | H04L 12/10 713/300 |
| 2011/0163605 | A1* | 7/2011 | Ronen | H04L 12/10 307/71 |
| 2013/0111245 | A1* | 5/2013 | Giat | H04L 12/4625 713/323 |
| 2013/0191655 | A1* | 7/2013 | Schlichter | H04L 12/10 713/300 |
| 2014/0208140 | A1* | 7/2014 | Brooks | G06F 1/28 713/320 |
| 2015/0091391 | A1* | 4/2015 | Dwelley | G05B 11/01 307/130 |
| 2015/0355701 | A1* | 12/2015 | Huang | G06F 1/266 711/103 |
| 2016/0054777 | A1* | 2/2016 | Dwelley | G06F 1/3206 710/110 |
| 2019/0305974 | A1* | 10/2019 | Lukacs | G06F 1/266 |

\* cited by examiner

*Primary Examiner* — Danny Chan
(74) *Attorney, Agent, or Firm* — Chih Feng Yeh; Huntington IP Consulting Co., Ltd.

(57) ABSTRACT

A power source equipment (PSE) controller exhibiting low standby levels for power over Ethernet (PoE) includes a micro-controller, a detection and classification circuitry coupled to the micro-controller to detect if a powered device (PD) is connected and determine power needed to operate the connected PD, a power control and monitor circuitry coupled to the micro-controller to power the connected PD and to monitor the power consumption of the PD. The detection and classification circuitry, the power control and monitor circuitry can be individually turned off by the micro-controller to minimize standby power, the micro-controller can be put into deep sleep if no PD is detected or can be come out of deep sleep if a PD is detected.

4 Claims, 5 Drawing Sheets

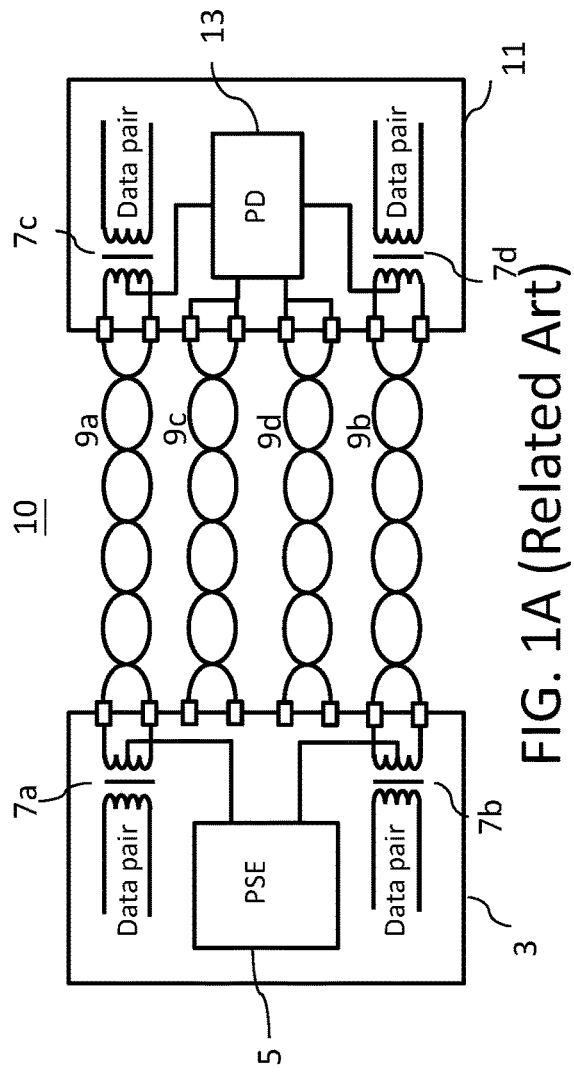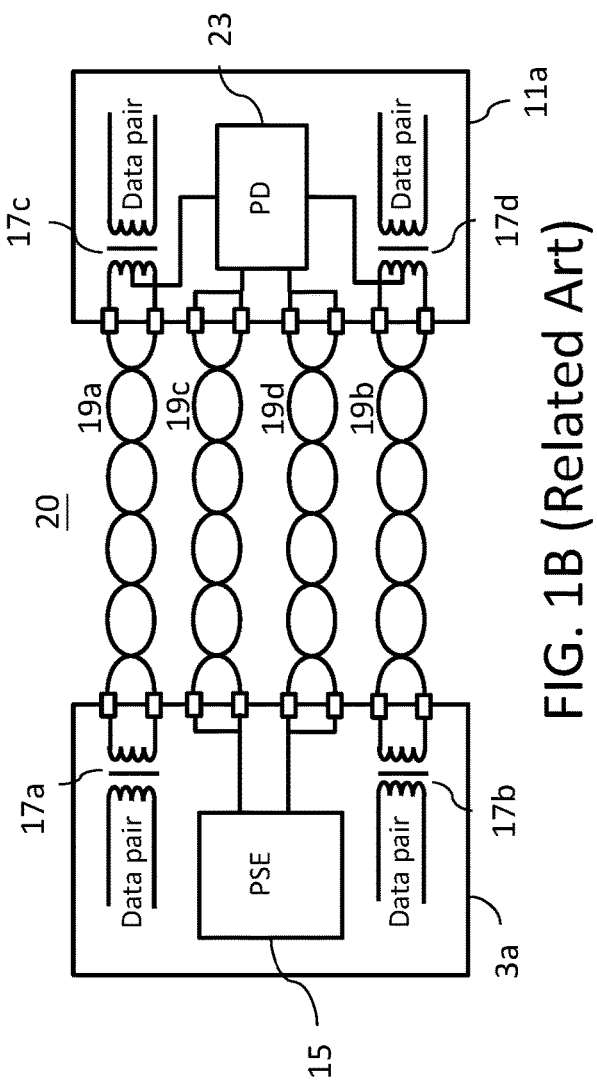
FIG. 1A (Related Art)
FIG. 1B (Related Art)

LOW STANDBY POWER CIRCUIT ARCHITECTURE FOR POWER SAVING WITHIN POWER SOURCE EQUIPMENT

TECHNICAL FIELD

The present invention generally relates to Power over Ethernet (PoE) devices, and more particularly to a power source equipment (PSE) controller IC or discrete component derived controller.

BACKGROUND

Power over Ethernet (PoE) describes standard systems which pass electric power in parallel to data over twisted pair Ethernet cabling. This allows a single cable to provide both data connection and electric power to devices such as wireless access points, security network cameras, IP (Internet Protocol) phones and other IP-based terminals.

Ethernet communications provide high speed data communications over a communications link between two communications nodes that operates according the IEEE (The Institution of Electrical and Electronic Engineers, Inc.) 802.3 Ethernet Standard. The communications medium between the two nodes can be twisted pair wires for Ethernet, or other types communications medium that are appropriate. Power over Ethernet (PoE) communication systems provide power and data communications over a common communications link. More specifically, a power source device (PSE) connected to the physical layer of the first node of the communications link provides DC power (for example, 56 volts DC) to a powered device (PD) at the second node of the communications link. The DC power is transmitted simultaneously over the same communications medium with the high-speed data from one node to the other node.

In a PoE system, its power is supplied in common mode over two or more of the differential pairs of wires found in the Ethernet cable and comes from a power supply within a PoE-enabled networking device, such as an Ethernet switch, or can be injected into a cable run with a midspan power supply. A midspan power supply, or called a PoE power injector, is an additional PoE power source that can be used in combination with an non-PoE switch. In general, endpoint PSEs place their power onto the data pair of wires in the cable, while midspan PSEs are restricted to using spare pair of wires. Here, three variants of PoE as contemplated by the IEEE 802.3af standard, as illustrated in FIGS. 1A, 1B and 1C, just used as examples for demonstrating possible PoE configurations. In FIG. 1A a data telecommunications networks 10 comprises a switch or hub 3 with integral PSE 5. Power from the PSE 5 is injected on the two data carrying Ethernet twisted pairs 9a and 9b via center-tapped transformers 7a and 7b. Non-data carrying Ethernet twisted pairs 9c and 9d are unused in this variant. The power from data carrying Ethernet twisted pairs 9a and 9b is conducted from center-tapped transformers 7c and 7d to PD 13 for use. In FIG. 1B a data communications network 20 comprises a switch or hub 3a with integral PSE 15. Power from the PSE 15 is injected on the two non-data carrying Ethernet twisted pairs 19c and 19d. Data carrying Ethernet twisted pairs 19a and 19b are unused in this variant for power transfer. The power from non-data carrying Ethernet twisted pairs 19c and 19d is conducted to PD 23 for use as shown. In FIG. 1C a data communications network 30 comprises a switch or hub 3b without integral PSE. Midspan power insertion equipment 31 simply pass the data signals on the two data carrying Ethernet twisted pairs 29a-1 and 29b-1 to corresponding data carrying Ethernet twisted pairs 29a-2 and 29b-2. Power from the PSE 25 located in the midspan power insertion equipment 31 is injected on the two non-data carrying Ethernet twisted pairs 29c-2 and 29d-2 as shown. The power from non-data carrying Ethernet twisted pairs 29c-2 and 29d-2 is conducted to PD 33 for use as shown. The powered end stations 11, 11a and 11b are all the same so that they can achieve compatibility with each of the previously described variants.

In the PoE system, the PSE can be configured in a variety of standard as well as non-standard modes for delivering various levels or classes of power. Each of the IEEE 802.3af and 802.3at standards contains specifications and configuration details. One part of each standards provides each PSE a mechanism to detect the presence of a PD at a network port, such as by sensing the resistance of a PD. For example, the PSE can detect whether a PD is attached as part of a start-up procedure before applying power. FIG. 2A-B depicts an example of a block diagram of the conventional control from the PSE section of an IC-based PoE system.

FIG. 2A depicts an IC-based PoE system, it includes a PSE device 201 and a PD 203 that electrically coupled via an Ethernet connection. In the example of FIG. 2A the Ethernet connection is demonstrated as RJ-45 connector and category 5e (CAT5E) cable that implement four twisted pair conductors including two communication ports. The PSE device 201 includes a voltage source 205 that is configured to generate a voltage signal. The PSE device 201 further includes a PSE controller 207 which performs the power management functions based on the dynamic needs of the PD 203. Further, the PSE controller 207 detects and validates a compatible PD 203, determines a power classification signature for the validated PD 203, supplies power to the PD 203, monitors the power, and reduces or removes power from the PD 203 when the power is no longer requested or required. The PD 203 includes a pair of rectifiers 209 that are each coupled to the Ethernet connection at the respective ports. The rectifiers 209 are configured to provide the voltage signal to PD 203. The PD further includes a PD controller 211 that monitors the voltage and current on the PD 203 side of the PoE configuration. The PD controller 211 further provides the necessary impedance signatures on the return path during initialization. A DC-DC converter 213 may be optionally insert before the load been attached to step down the voltage as necessary to meet the voltage requirements of the PD 203.

FIG. 2B shows the block diagram of the output control circuit for one PSE channel. The PSE micro-controller 207 provide a gate signal (pass control) to modulate the impedance of the circuit breaker MOSFET (not shown) in each output channel. By controlling the MOSFET impedance, the output voltage of each channel can be tailed to perform detection, classification, full power application and power removal via PSE sensing and control circuit 215. Current and voltage sensors provide continuous feedback signals, i.e. $I_{sense}$ and $V_{sense}$ respectively, for the PSE micro-controller 207 to supervise and execute the power management according to IEEE 802.3af specifications.

PoE technology is continuing to evolve. The PD power limitation outlined in IEEE 802.3af of 13 W is becoming inadequate for some new applications. Next-generation PoE applications will call for more power to support demanding features, and at the same time demand increased power efficiency in an effort to be more "green" and reduce costs. In early 2016 the department of energy (DOE) of the USA and Europe Union (EU) code of conduct (COC) officially enacted regulations, i.e. DOE level VI and COC tier II respectively, to increase the average efficiency of external power sources (EPS) and to lower standby levels. The lower standby levels for both the DOE level VI and COC tier II are very difficult to meet for active/IEEE802.3 based POEs. In order to meet the requirements, the PoE related circuitry needs to be shut down or removed and software needs to go into deep sleep. Therefore, in order to pass the standby requirements of the DOE level VI and COC tier II design changes for low standby power circuit architecture of PoE operation need to be addressed.

SUMMARY

In this invention, a novel circuit architecture and methodology for controlling standby power of PoE operation is proposed.

A power source equipment (PSE) controller exhibiting low standby levels for power over Ethernet (PoE) includes a micro-controller, a detection and classification circuitry coupled to the micro-controller to detect if a powered device (PD) is connected and determine power needed to operate the connected PD, a power control and monitor circuitry coupled to the micro-controller to power the connected PD and to monitor the power consumption of the PD. The detection and classification circuitry, the power control and monitor circuitry can be individually turned off by the micro-controller to minimize standby power, the micro-controller can be put into deep sleep if no PD is detected or can be come out of deep sleep if a PD is detected.

In accordance with one aspect of the disclosure, the micro-controller is an integrated circuit, microprocessor, or any type of digital programmable device.

In accordance with one aspect of the disclosure, the power and control circuitry is coupled to a electronically controlled switch to power up the PD or remove power from the PD by controlling the on/off states of electronically controlled switch the through sending control signals from the micro-controller.

In accordance with one aspect of the disclosure, the micro-controller uses a voltage or current to ping the output of the PSE to determine if a PD is attached.

In accordance with one aspect of the disclosure, the electronically controlled switch is a metal-oxide-semiconductor field effect transistor (MOSFET).

A method of providing control of standby power for a power sourcing equipment (PSE) includes providing a micro-controller, providing a detection and classification circuitry, providing a power control and monitor circuitry, turning on a power coupled to power sourcing equipment, turning off the power control and monitor circuitry and turning on the detection and classification circuitry for a first period of time. In the event the detection and classification circuitry detects a powered device (PD), checking if the PD is coupled, if the PD is coupled deactivating the detection and classification circuitry, powering the PD by activating the power control and monitor circuitry. In the event the detection and classification circuitry does not detect a powered device, deactivating the detection and classification circuitry, putting the micro-controller to sleep, after a second period of time waking up the micro-controller.

In accordance with one aspect of the disclosure, in the event the detection and classification circuitry detects a powered device (PD) further including steps of checking if signature resistance value of the coupled PD within a predetermined range by the detection and classification circuitry, if the signature resistance value is within the predetermined range, proceeding class detection of the coupled PD by the detection and classification circuitry.

BRIEF DESCRIPTION OF THE DRAWINGS

The components, characteristics and advantages of the present invention may be understood by the detailed descriptions of the preferred embodiments outlined in the specification and the drawings attached:

FIG. 1A illustrates a block diagram of a conventional Power over Ethernet (PoE) system of a first alternative configuration for remote powering from an endpoint PSE according to the related art.

FIG. 1B illustrates a block diagram of a conventional Power over Ethernet (PoE) system of a second alternative configuration for remote powering from an endpoint PSE according to the related art.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1C:
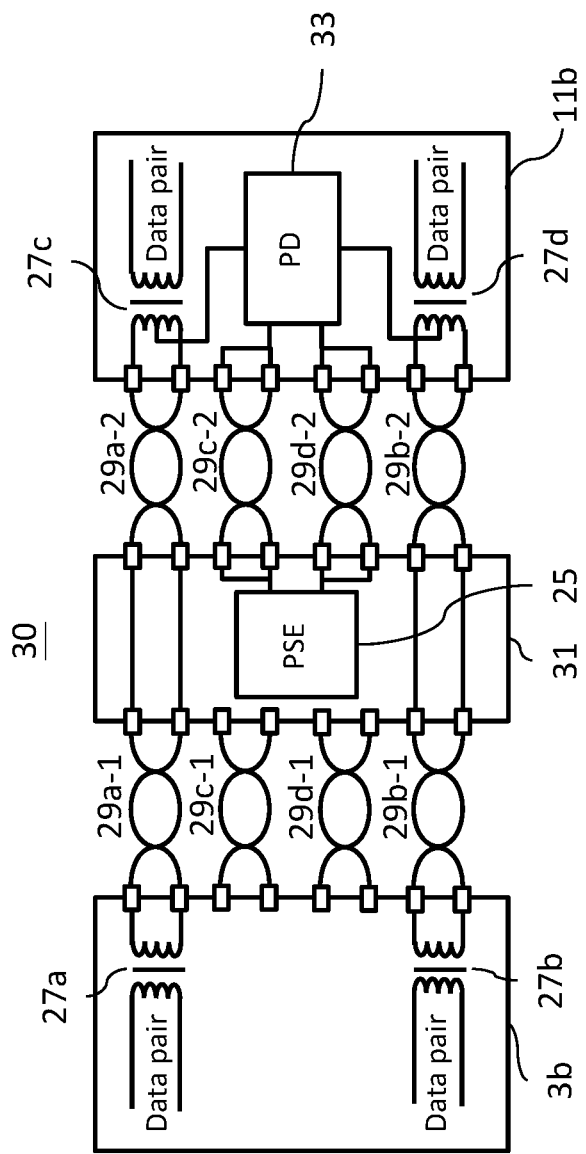
FIG. 1C illustrates a block diagram of a conventional Power over Ethernet (PoE) system of a first alternative configuration for remote powering from a midspan PSE according to the related art.
Figure 2A:
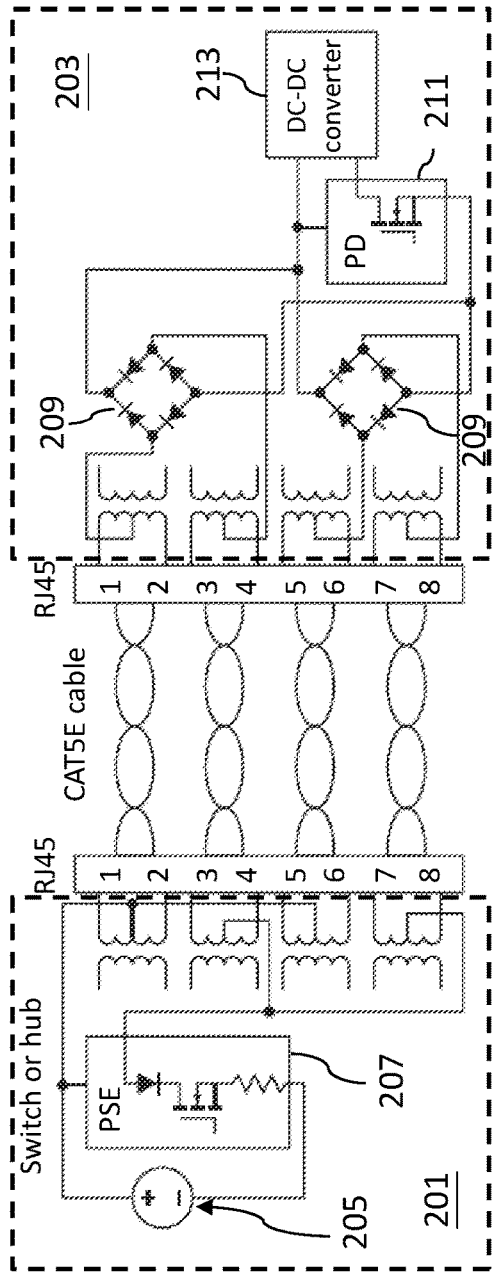
FIG. 2A illustrates an IC-based configuration for the control of power from the PSE according to the related art.
Figure 2B:
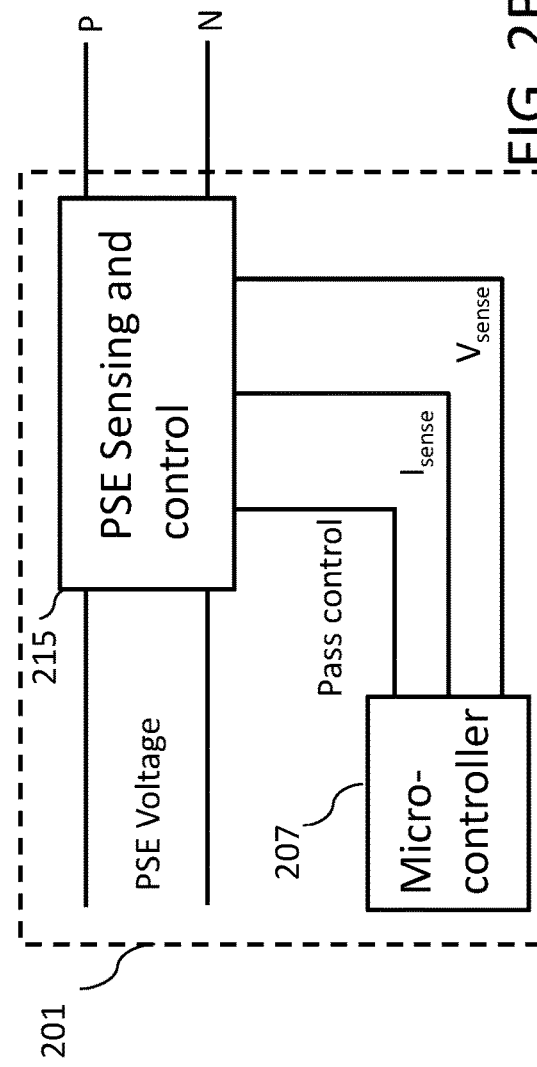
FIG. 2B illustrates a block diagram of the PSE section of the PoE system according to the related art.

As mentioned in the background, FIGS. 1A-1C give examples of conventional configurations of a PoE system. However, for the next generation of PoE applications a higher power PSE solution will be needed to support PDs with power hungry demanding features, for example dual-radio wireless access points, security cameras and radio frequency identification (RFID) readers.

In general, a PSE device applies power from an external power supply to an Ethernet cable through an electronically controlled switch such as a metal-oxide-semiconductor field effect transistor (MOSFET). The main functions of the PSE are to search the link for a PD requesting power, optionally classify the PD, supply power to the link if a PD is detected, monitor the power on the link, and disconnected power when it is no longer requested or required. A PD participates in PD detection procedure by presenting a PoE detection signature defined by the IEEE 802.3af standard. If the detection signature is valid, the PD has an option of presenting a classification signature to the PSE to indicate how much power it will draw when powered up.

In the PoE system, the PSE is configured to detect the PD by ascertaining a valid signature resistance, and supply power over the two or more twisted wire pairs. The key technology to implement the PSE is the power management and the PoE provision process. The PSE is the manager of the PoE process, controlling the PoE process described hereafter. As such, it holds the PoE "intelligence", therefore a CPU is required to control the PoE process while other analog components are doing the switching, sensing and power filtering activities.

In the beginning, only small voltage level is induced on the port's output, i.e. phase (I), till a valid PD is detected during the detection period. The PSE may choose to perform classification (phase (2)), to estimate the amount of power to be consumed by this PD. After a time-controlled start-up (phase (3)), the PSE begins supplying the 48 Vdc level to the PD (phase (4)), till it is physically or electrically disconnected (phase (5)). Upon disconnection, voltage and power shut down. Several incidents as consumption overload, short circuit, out-of-power-budget and other scenarios, may terminate the process in the middle, only to restart from the phase (1) again.

Since the PSE is responsible for the PoE process timing, it is the one generating the probing signals prior to operation the PD and monitoring the various scenarios that may occur during operation. All probing can be done using voltage induction and current measurement in return. Before power is applied, safety dictates that a valid PD is connected to the PSE's output. This process is referred to as "line detection", and involves the PSE seeking a specific, 25 kilo-ohm (KΩ) signature resistor. In a real operation, the measured resistance falls between threshold values, such as between 17 and 29 KΩ or 19 and 26.5 KΩ. Detection of this signature indicates that a valid PD is connected, and that provision of power to the device may commence.

Figure 3:
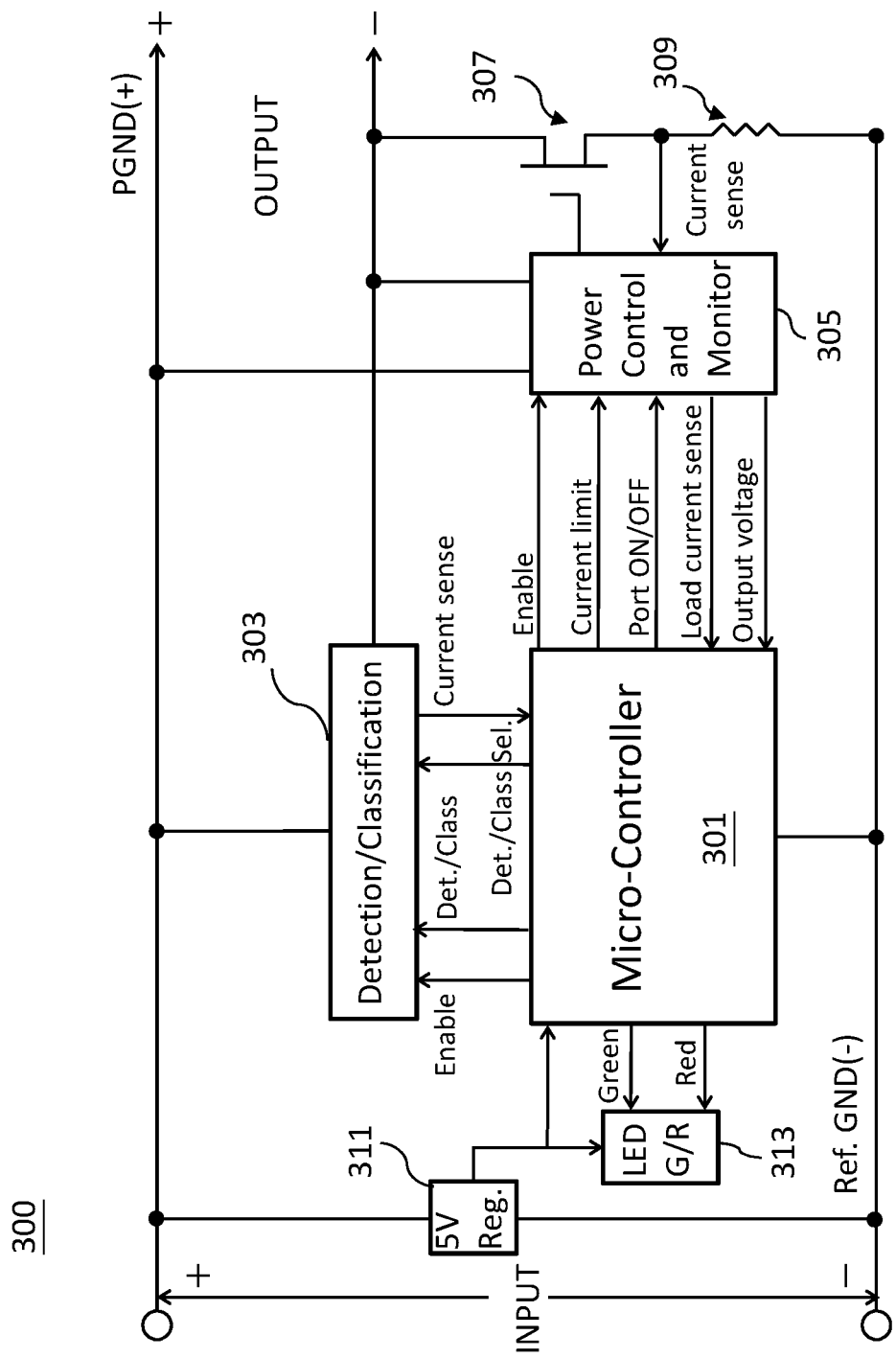
FIG. 3 illustrates a block diagram for the control of power from the PSE according an embodiment of the present invention.

FIG. 3 illustrates a block diagram for the control of power from the PSE 300 according an embodiment of the present invention, which comprises a micro-controller 301, a detection/classification circuit 303, a power control and monitor circuit 305, an electronically controlled switch 307, a sensing resistor 309, a 5V voltage regulator 311 and a LED G/R circuit 313. A negative lead (−) of power source input is coupled to the micro-controller, to the 5V voltage regulator 311 and to a first end of the sensing resistor 309, and defines a node Ref. GND(−). The other end of the sensing resister 309 is coupled to the electronically controlled switch 307. A positive lead (+) of power source is coupled to the 5V voltage regulator 311, to the detection/classification circuit 303 and to the power control and monitor circuit 305, and defines a node PGND(+)/output (+). An output (−) node is coupled to the detection/classification circuit 303, the power control and monitor circuit 305 and the electronically controlled switch 307. A valid PD may be coupled across nodes output (+) and output (−).

The PSE 300 can receive power from an external power supply coupled to the PSE via input (+) and input (−) nodes and deliver it to attached PDs through output (+) and output (−) nodes.

The micro-controller 301 is configured to coupled to the power supply, to the 5V voltage regular 311, to the LED G/R circuit 313, to the detection/classification circuit 303 and to the power control and monitor circuit 305.

In one of the preferred embodiments, the micro-controller 301 may contain PoE state machine such as control logic for detection/classification, gate driver for the electronically controlled switch i.e. MOSFET, mode control and power good logic, etc., which includes a plurality of comparators, analog to digital converters and multiplexers for performing the procedures that mentioned previously.

The power supply can be a switched mode power supply (SMPS) coupled to the PSE circuit to provide a DC voltage for internal circuitry of the micro-controller 301 with the ability to remove the DC voltage from the detection/classification circuit 303, the power control and monitor circuit 305 to minimize power consumption. The SMPS can regulate the supply voltage to provide power to at least one of the analog to digital converters, the classification module, the multiplexer and micro-controller core.

The detection/classification circuit 303 is coupled to the micro-controller 301, the input (+) node, the output (+) and output (−) nodes. The micro-controller 301 can perform PD detection and classification operations via the detection/classification circuit 303 when a PD is coupled to the outputs, i.e. output (+) and output (−) nodes, as specified by the PoE standards.

In one of the preferred embodiments, the detection/classification circuit contains a powered device detection module, a classification module and a detection/classification mode selection device. The powered device detection module may be a load detector, the classification module may include a current limit circuit such as fold-back current limit circuit.

In the beginning the detection/classification circuit 303 can be activated (Enabled) by the micro-controller 301 to initiate PD detection through selecting the detection mode between detection and classification function (Det./Class) by a mode selection control (Det./Class Sel.). The PD detection can be validated by applying a specific current level then measuring the resulting voltage or vice versa to distinguish between a valid PD signature, an invalid device, an open load and a short circuit.

In subsequence, the micro-controller 301 can select the classification mode between detection and classification function (Det./Class) by a mode selection control (Det./Class Sel.). The PSE 300 determines the power classification signature of coupled PD by measuring the classification current for a given classification reference voltage.

After accomplishing detection/classification of the coupled PD, the power control and monitor circuit 305 can be activated (Enabled) by the micro-controller 301 to power the PD by turning on (Port ON) the electronically controlled switch 307 with a current limit corresponding to the classification results. If the output current limit exceeds threshold value for longer than a period of time, the output is shut down by turning off (Port OFF) the electronically controlled switch 307. In one of the preferred embodiments, the power control and monitor circuit 305 may contain a driver for controlling the ON/OFF state of the electronically controlled switch 307, a current sensing circuit for measuring the current by loading current sense (Load current sense) that passes the sensing resistor 309 coupled to the electronically controlled switch 307. After the power is applied to a PD, the load is constantly monitored by the micro-controller 301 to ensure it stays within specified ranges of current, voltage and time. If an out of range level be detected the power is disconnect. Once power has been disconnected to a PD, it remains off until the PSE goes through the detection process and verifies that a compatible PD is connected. The micro-controller 301 can perform power monitoring of the PD by loading current sense (Load current sense) that passes the resistor 309 coupled to the the electronically controlled switch 307, perform port overload, port inrush and short circuit protections by continuously monitoring the output voltage (output voltage) via the power control and monitor circuit 305.

The LED G/R circuit 313 is a port state LED driver which can indicate the states of different conditions of port connection, which is powered by the 5V regulation circuit 311.

In one of the preferred embodiments, the 5V regulation circuit can be a zener controlled transistor series voltage regulator that provides 5 volts dc. The micro-controller 301 can control the port state LED driver inside to inform user of the port status by activating on/off of the individual LED (green or red LED) or activating LED lighting patterns, such as the port is connected to a PD and power is applied, or the port is not connected, or the port is connected to a non-powered device or the port will not be powered. The micro-controller 301 also contains an internal square wave, pulse width modulation (PWM) signal generator. In one preferred embodiment, the micro-controller 301 utilizes a PWM method for LED indicator brightness during power control (through LED G/R circuit 313, i.e. LED indicator). (i) When output power (or current) of the PSE is low the LED is dim, duty cycle of the PWM is setting low for saving power and increasing efficiency at low PSE output power. (ii) When output power (or current) of the PSE is high the LED is bright, the duty cycle of PWM is setting high. (iii) The LED light intensity is controlled by micro-controller 301 through monitor the output power (or current) of the PSE.

During PSE operation, the core of the micro-controller 301 can be put into sleep, the coupled detection/classification circuit 303 and the power control and monitor circuit 305 can be disabled individually by the micro-controller 301 for lowering power consumption. For example, the discrete solution opens circuitry to reduce the overall power consumption and in parallel the firmware (FW) goes into deep sleep just pining the output with a low voltage or low current signal to see if a load (PD) was connected.

Figure 4:
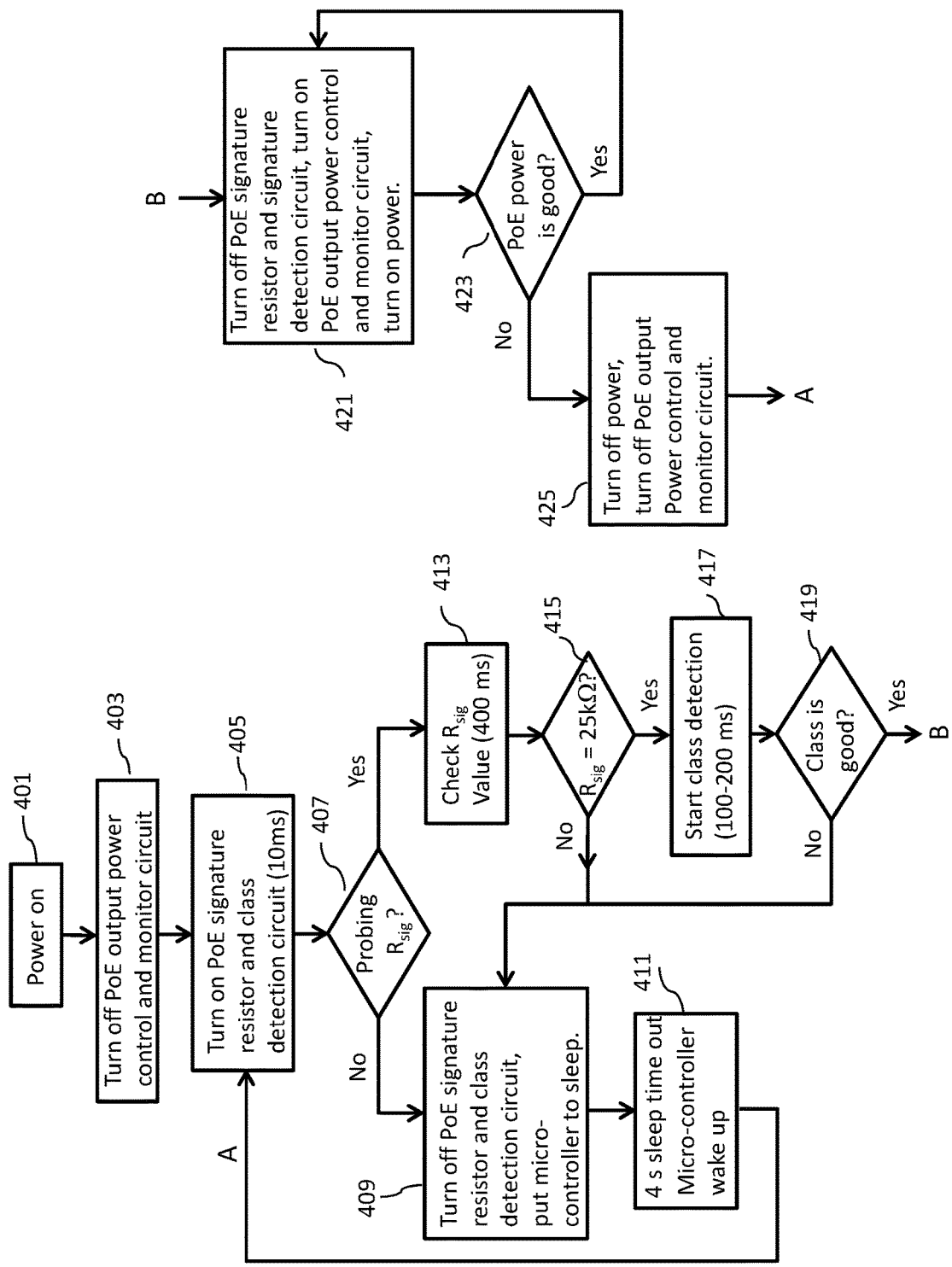
FIG. 4. illustrates state diagram control of standby power for the PoE operation according an embodiment of the present invention.

FIG. 4 illustrates state diagram control of standby power via hardware for the PoE operation according an embodiment of the present invention. During no load/standby loading the PSE IC or discrete solution, i.e. the circuitry shown in FIG. 3, will turn off part of the circuitry to reduce power consumption. The discrete solution opens circuitry to reduce the overall power consumption and in parallel the FW goes into deep sleep just pinging the output with low voltage or low current signature to see if a load was connected.

A method of providing a control of standby power for PSE are disclosed as follows, in step 401 turns on the power of the PoE, in step 403 turns off the output power control and monitor circuit (indicated as 305 in FIG. 3), in step 405 turns on the PoE signature resistor and class detection circuit (indicated as 303 in FIG. 3) for 10 ms. In step 407, if the signature resistor ($R_{sig}$) of coupled PD is not probed then proceeds to step 409, in step 409 turns off the PoE signature resistor and class detection circuit (indicated as 303 in FIG. 3), puts the micro-controller (indicated as 301 in FIG. 3) to sleep, then advances to step 411. In step 411, after 4s sleep time out wakes up the micro-controller (indicated as 301 in FIG. 3) then returns to step 405. If the $R_{sig}$ of coupled PD is probed then proceeds to step 413, in step 413 checks the $R_{sig}$ value of coupled PD for about 400 ms. In step 415, if the $R_{sig}$ value of coupled PD is not 25 kΩ, in real situation the measured resistance falls outside threshold values, such as outside the values between 17 and 29 KΩ or 19 and 26.5 KΩ, the PD is considered not connected then returns to step 409. If the signature resistor of coupled PD is 25 kΩ, such as between 17 and 29 KΩ or 19 and 26.5 KΩ in real situation, the PD is considered connected then advances to step 417. In step 417 starts class detection of the coupled PD for about 100-200 ms to determine the class of the coupled PD, then proceeds to step 419. In step 419 checks the class of the coupled PD. If the class of the coupled is not good then returns to step 409. If the class of the coupled is good then advances to step 421, in step 421 turns off the PoE signature resistor and signature detection circuit (indicated as 303 in FIG. 3), turns on the PoE output power control and monitor circuit (indicated as 305 in FIG. 3), turns on power, then proceeds to step 423. In step 423 checks the PoE power. If PoE power is good then returns to step 421. If PoE power is not good then advances to step 425. In step 425 turns off power, turns off PoE output power control and monitor circuit (indicated as 305 in FIG. 3), then returns to step 405.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A method of providing control of standby power for a power sourcing equipment (PSE) of power over Ethernet (PoE), the method comprising:
   providing a micro-controller;
   providing a detection and classification circuitry;
   providing a power control and monitor circuitry;
   turning on a power coupled to the power sourcing equipment;
   turning off the power control and monitor circuitry;
   turning on the detection and classification circuitry for a first period of time;
      wherein the micro-controller is arranged to:
         in the event the detection and classification circuitry detects a powered device (PD), deactivating the detection and classification circuitry and powering the PD by activating the power control and monitor circuitry; and
         in the event the detection and classification circuitry does not detect the powered device, deactivating the detection and classification circuitry, putting the micro-controller to sleep, and waking itself up after a second period of time, wherein the second period of time is 4s.

2. The method of claim 1, wherein in the event the detection and classification circuitry detects the powered device (PD) further comprising:
   checking if signature resistance value of coupled PD within a predetermined range by the detection and classification circuitry, if the signature resistance value is within the predetermined range, proceeding with class detection of the coupled PD by the detection and classification circuitry.

3. The method of claim 1, wherein the first period of time for turning on the detection and classification circuitry is 10 ms.

4. The method of claim 2, wherein the predetermined range of the signature resistance of the coupled powered device is the values between 17 and 29 KΩ or 19 and 26.5 KΩ.

* * * * *